(12) United States Patent
Poussin et al.

(10) Patent No.: US 8,537,214 B2
(45) Date of Patent: Sep. 17, 2013

(54) METHOD OF REGULATING A HARMONIZATION COMPENSATION BETWEEN VIDEO SENSOR AND HEAD UP DISPLAY DEVICE, AND CORRESPONDING DEVICES

(75) Inventors: Sandra Poussin, Tournefeuille (FR); David Bideau, Toulouse (FR); Laurent Coloma, Toulouse (FR); Stephane Gauthier, Toulouse (FR)

(73) Assignee: Airbus Operations SAS, Toulouse (FR)

( * ) Notice: Subject to any disclaimer, the term of this patent is extended or adjusted under 35 U.S.C. 154(b) by 996 days.

(21) Appl. No.: 12/540,605

(22) Filed: Aug. 13, 2009

(65) Prior Publication Data
US 2010/0060730 A1 Mar. 11, 2010

(30) Foreign Application Priority Data
Sep. 9, 2008 (FR) ..................... 08 04930

(51) Int. Cl.
*H04N 7/00* (2011.01)
(52) U.S. Cl.
USPC ............. 348/115; 348/117; 345/4; 345/5; 345/6; 345/7; 345/8; 345/9; 340/901; 340/902; 340/903; 340/904; 340/905
(58) Field of Classification Search
USPC ............ 345/4–9; 340/901–905; 348/115, 348/117
See application file for complete search history.

(56) References Cited

U.S. PATENT DOCUMENTS

| | | | |
|---|---|---|---|
| 4,001,499 A | 1/1977 | Dowell | |
| 4,034,401 A | 7/1977 | Mann | |
| 4,752,824 A | 6/1988 | Moore | |
| 5,150,117 A * | 9/1992 | Hamilton et al. | 340/973 |
| 5,296,854 A * | 3/1994 | Hamilton et al. | 340/980 |
| 5,414,439 A * | 5/1995 | Groves et al. | 345/7 |
| 5,990,935 A * | 11/1999 | Rohlfing | 348/39 |
| 7,446,768 B2 * | 11/2008 | Satoh et al. | 345/427 |
| 2002/0063778 A1 | 5/2002 | Kormos | |
| 2002/0167536 A1* | 11/2002 | Valdes et al. | 345/633 |
| 2004/0080467 A1* | 4/2004 | Chinthammit et al. | 345/7 |
| 2006/0152434 A1* | 7/2006 | Sauer et al. | 345/8 |
| 2006/0176242 A1* | 8/2006 | Jaramaz et al. | 345/7 |
| 2010/0231705 A1* | 9/2010 | Yahav et al. | 348/115 |

FOREIGN PATENT DOCUMENTS
EP 0 511 154 A2 10/1992

* cited by examiner

*Primary Examiner* — Thomas Dailey
(74) *Attorney, Agent, or Firm* — Oblon, Spivak, McClelland, Maier & Neustadt, L.L.P.

(57) ABSTRACT

The invention relates to a method for adjustment of a harmonization compensation applied to alleviate a discrepancy of conformity between a video image transmitted by a video transducer (1) and projected by a head-up display device (5, 6), of an aircraft, and an external scene ahead of the aircraft. At least one equipment item of the aircraft—preferably the said HUD device—equipped with at least one control element accessible in the cockpit, is programmed to be able to function according to a nominal mode and according to a maintenance mode, in which at least one of its control elements, known as a redirected control element, is used to define the applied harmonization compensation. An operator activates the maintenance mode and starts an adjustment operation, in which he modifies in real time the applied harmonization compensation, by manipulating at least one redirected control element, until the video image is matched with the external scene.

10 Claims, 3 Drawing Sheets

METHOD OF REGULATING A HARMONIZATION COMPENSATION BETWEEN VIDEO SENSOR AND HEAD UP DISPLAY DEVICE, AND CORRESPONDING DEVICES

The present invention relates to a method for adjustment of a compensation applied to alleviate a discrepancy of conformity between, on the one hand, a video image transmitted by a video transducer and projected onto a screen by a head-up display device—known as a HUD device—of an aircraft, and, on the other hand, an external scene ahead of the aircraft and visible through the said screen and/or a symbology generated and projected onto this screen by the HUD device.

It is in fact known to use a video transducer to capture an image of the external environment ahead of the aircraft for the purpose of improving the perception of this environment by the pilot. The image delivered by the video transducer is projected, in a manner focused at infinity, by the HUD device onto a transparent screen, in such a way that it is superposed on the external scene viewed by the pilot through this screen. Furthermore, the symbology generated by the HUD device is also projected onto the screen in such a way that it is superposed on the external scene viewed by the pilot.

According to the standards currently in force, the discrepancy of alignment between the line of sight of the HUD device, defined as being the axis passing through the theoretical eye of the pilot and the center of projection on the screen, and the line of sight of the video transducer, or in other words the optical axis of the said transducer, must not exceed 5 mrad. In addition, the resultant image projected by the HUD device, formed by the superposition of the video image transmitted by the video transducer and of the symbology generated by the HUD device, must be in conformity with the external scene viewed by the pilot.

The alignment requirements imposed by the standards are all the more difficult to meet because the equipment items involved are installed on separate parts of the structure of the aircraft: the HUD device is borne by a support installed in the cockpit, generally at the high part thereof, while the video transducer is borne by a support fixed to an external portion of the structure of the nose cone of the aircraft, ahead of the cockpit.

The precision, in terms of alignment, that can be achieved mechanically by design of the structure of the aircraft and of the supports of the HUD device and video transducer is insufficient and incapable of satisfying the standards in force. A compensation, known as harmonization compensation, is therefore necessary. This harmonization compensation may be achieved electronically and/or optically by one of the equipment items (HUD device or video transducer) or by both. For this purpose, a preliminary harmonization method is employed during manufacture of the aircraft. This method leads to the definition of alignment errors or of compensation values to be applied. These are stored in a memory module of the aircraft and are ultimately used by the equipment items to achieve the necessary compensation.

That being the case, the video transducer, considering its location at the nose cone, is subjected to considerable shocks and stresses, even more so in the case of an aircraft for military use, required to maneuver in difficult environments (short terrains, forced and difficult landings, etc.). These shocks and stresses tend to modify the position of the video transducer and/or to cause deformations of its support and even of the surrounding structure of the aircraft. The compensation achieved by the equipment item(s) on the basis of alignment errors stored in memory in the phase of manufacture of the aircraft is then subject to a great risk of being erroneous.

In addition, a lack of conformity between the image obtained from the video transducer, the symbology generated by the HUD device and the external scene may also be observed following a change (total or partial) of one of the equipment items. In fact, taking manufacturing tolerances into account, each equipment item has an intrinsic error of orientation between its line of sight (optical axis of the video transducer, for example) and its external housing. Depending on the value of the intrinsic error of the new equipment item, an alignment discrepancy larger than the standards may be detected.

It is therefore necessary to offer a possibility for fine tuning the harmonization compensation achieved by the equipment item(s) once again after the aircraft has been delivered.

The invention relates to providing a method for adjustment of this compensation which satisfies the safety requirements in force and which does not lead to a significant increase in the weight of the aircraft. The invention also relates to providing a set of devices capable of permitting the employment of this method.

Another objective of the invention is to propose a method that can be used by only two persons, and this in order to limit the labor costs for maintenance.

For this purpose, the invention relates to a method for adjustment of a compensation, known as harmonization compensation, applied to alleviate a discrepancy of conformity between, on the one hand, a video image transmitted by a video transducer and projected onto a screen by a head-up display device—known as the HUD device—of an aircraft, and on the other hand, an external scene ahead of the aircraft visible through the said screen and/or a symbology generated and projected onto this screen by the HUD device, the aircraft comprising equipment items provided with control elements accessible in the cockpit, each control element being capable of emitting control signals that are used, in a mode of operation known as nominal mode, to modify control parameters of the corresponding equipment item.

The method according to the invention is characterized in that:
  at least one equipment item of the aircraft, known as a redirectable equipment item, is pre-programmed in such a way that it can function alternatively according to the nominal mode and according to another mode, known as the maintenance mode, in which the control signals of at least one of its control elements, known as a redirected control element, are used to define the applied harmonization compensation,
  an operator activates the maintenance mode and starts an adjustment operation,
  in the context of this adjustment operation, the operator observes, from the pilot's position, on the one hand the video image transmitted by the video transducer and projected onto the screen, and on the other hand the external scene through the screen and/or the symbology projected onto the screen, and modifies in real time the applied harmonization compensation, by manipulating at least one redirected control element, until the video image is matched with the external scene and/or with the symbology,
  at the end of this adjustment operation, the operator performs a final validation action that ends the adjustment operation and initiates recording, in memory means installed on board the aircraft, of one or more values representative of the harmonization compensation applied at the end of the adjustment operation.

In this way the method according to the invention uses the usual control elements of an equipment item of the aircraft to define and modify the applied harmonization compensation. In the present case the term "equipment item" designates any usual and known equipment item of an aircraft, as opposed to a specific device that would have the sole function of adjusting the harmonization compensation. These usual equipment items are considered to include in particular the HUD device itself as well as any instrument for aid in navigation. In this way the invention makes it possible to offer the possibility of adjusting the harmonization compensation after delivery of the aircraft, without the aircraft's compromising a control or a supplementary dedicated man-machine interface for this purpose. This possibility is therefore offered without increasing the weight of the aircraft and without negative effect on safety. In fact, it has been proved that the risks of pilot error increase with the number of controls of an aircraft. Such risks are even greater in an aircraft for military use, which comprises, in addition to the usual controls of an aircraft for civilian use, further controls for execution of its military functions. The method according to the invention is therefore particularly advantageous in the case of a military aircraft. In addition, the safety is also preserved by virtue of the fact that the adjustment of the harmonization compensation can be achieved only during a maintenance mode.

It is to be noted that the screen defined in the foregoing may be a screen forming an integral part of the HUD device or an independent screen disposed in front of a glass canopy (windshield) of the cockpit or simply a part of this glass canopy (the video image and the symbology can be effectively projected directly onto the glass canopy).

In the case of an aircraft provided with two HUD devices (one for the pilot and one for the copilot), it is also to be noted that the term "pilot" as used in the foregoing denotes the pilot or copilot depending on whether the adjustment method is employed for the HUD device of the pilot or for that of the copilot.

In order to achieve great precision in adjustment, especially at the center of the field of the HUD device, there is preferably used a target, which is installed in the external scene—for example at approximately one hundred meters ahead of the aircraft—in the alignment of the center of the field of the HUD device. In this case, the method according to the invention comprises, after activation of the maintenance mode and prior to the adjustment operation, an operation of positioning of the said target, in which: the HUD device projects onto the screen a reference symbol representing the center of its field; a first operator enters the external scene and displaces the target; a second operator, situated in the cockpit at the position of the pilot, observes the target through the screen and guides the first operator until superposition is established between a mark (preferably luminous) borne by the target and the reference symbol projected by the HUD device. During the adjustment operation, the operator then attempts to achieve matching of the image of the target transmitted by the video transducer and projected onto the screen by the HUD device with the real target viewed through the screen (and the glass canopy of the cockpit); more precisely, he attempts to superpose the image of a luminous mark of the target onto another luminous mark of the real target.

With the exception of this operation of positioning of the target, all of the steps of the method according to the invention can be accomplished by one operator alone, from the cockpit.

Advantageously, the redirectable equipment item is preprogrammed in such a way that it authorizes activation of the maintenance mode only when the engines of the aircraft are off. This characteristic has the purpose of safety: since the adjustment method according to the invention cannot be employed in flight, it does not affect the workload of the crew and does not risk degrading the performances of the video transducer. In addition, there is also no risk of involuntary redirection, in flight, of the control elements of the redirectable equipment item.

The maintenance mode is preferably activated from a maintenance computer connected to the HUD device and to the redirectable element.

Advantageously, for the purpose of optimization, the redirectable equipment item is the HUD device.

The redirected control elements defined in the foregoing can be chosen from among the multitude of control elements of the cockpit, but they are preferably chosen from among: a button for actuating a potentiometer for adjusting the luminance of the HUD device, an anti-congestion button, known as the "declutter" button, of the HUD device.

Advantageously, the potentiometer for adjusting the luminance is used, during the adjustment operation, to define successively an angular value of compensation in transversal direction, known as the transversal compensation value, and an angular value of compensation in vertical direction, known as the vertical compensation value. In the usual way, considering that the aircraft is positioned on flat horizontal ground during employment of the method according to the invention, the vertical direction corresponds to the direction of gravity and the transversal direction corresponds to the horizontal direction of the wing span of the aircraft.

The declutter button is advantageously used to validate the operation of positioning of the target, to validate each step of the adjustment operation and to perform the final validation action.

In the usual way, the harmonization compensation is achieved by at least one equipment item, known as the compensator equipment item, chosen from among the video transducer and the HUD device, which compensator equipment item is provided with compensation means that define, for example, a range of transversal compensation values and a range of vertical compensation values. Possibly, as a variant or in combination, these compensation means define a range of values of compensation in rotation around a longitudinal direction of the aircraft, or in other words a range of values of compensation in roll.

Preferably the compensator equipment item is the video transducer, which for this purpose is advantageously adapted to extract at least one image to be transmitted to the HUD device from a captured image of greater dimension than the image to be transmitted.

Advantageously, the adjustment operation comprises a phase of adjustment in the transversal direction and a phase of adjustment in the vertical direction, these two phases being capable of being performed in one order or in the other. Possibly, as a variant or in combination, the adjustment operation can comprise a phase of adjustment in rotation, and especially a phase of adjustment in roll (rotation around a longitudinal direction of the aircraft).

The phase of adjustment in transversal direction advantageously comprises an initialization step, known as the transversal initialization step, making it possible to coordinate the range of adjustment of the potentiometer of the HUD device and the range of transversal compensation values of the compensator equipment item. In this step, the HUD device or possibly the maintenance computer is used, for example, to display:

a bar representing both the range of adjustment of the potentiometer and the range of transversal compensation values of the compensator equipment item, a cursor on this bar representing the instantaneous position of the potentiometer relative to its adjustment range, the HUD device determining in real time the position of the cursor to be displayed relative to the bar on the basis of control signals emitted by the potentiometer, a mark on this bar, representing the transversal compensation value currently applied by the compensator equipment item relative to its range of transversal compensation values.

Preferably, the HUD device is also used to display instructions for processing of the step (and of the adjustment operation in general).

For the operator, this transversal initialization step consists essentially in manipulating the potentiometer button in such a way as to align the said cursor (which follows the angular displacements of the potentiometer button) with the said reference symbol (which remains fixed, since the transversal compensation value is not modified). This transversal initialization step is then validated by the operator by means of the declutter button.

The phase of adjustment in the transversal direction then advantageously comprises a step of fine tuning the transversal compensation value. In this step, the HUD device, or if necessary the maintenance computer, transforms by a real-time calculation any angular displacement of the potentiometer into an angular difference of transversal compensation, by using the ratio between the range of transversal compensation values and the range of adjustment of the potentiometer. Furthermore, the video transducer applies, in real time, a transversal compensation value fine tuned in real time with the aid of this angular difference (this value is transmitted to it by the HUD device). For the operator, the step of fine tuning the transversal compensation value therefore consists essentially in checking the external scene and the video image transmitted by the video transducer and projected by the HUD device, and in manipulating the potentiometer button until matching of the video image with the external scene (and, for example, matching of the image of a mark of a target with a mark of the real target) is achieved in the transversal direction. When the matching is observed, the operator validates this step of fine tuning the transversal compensation value with the aid of the declutter button. This validation leads to temporary recording of the currently applied transversal compensation value, which value makes it possible to compensate for a transversal alignment discrepancy of the video transducer relative to the external scene (or in other words relative to a reference axis of the aircraft).

In a manner analogous to the phase of adjustment in transversal direction, the phase of adjustment in vertical direction preferably comprises a vertical initialization step, which makes it possible to coordinate the adjustment range of the potentiometer and the range of vertical compensation values of the compensator equipment item, then a step of adjustment of the vertical compensation value. The validation of this latter value with the aid of the declutter button leads to temporary recording of the vertical compensation value applied at the end of fine tuning, which value makes it possible to compensate for a vertical alignment discrepancy of the video transducer relative to the external scene (or in other words relative to a reference axis of the aircraft). In this way the fine tuning of transversal and vertical compensation values makes it possible to satisfy the alignment requirements imposed by the standards.

In a manner analogous to the phase of adjustment in transversal direction, as the case may be, the phase of adjustment in roll preferably comprises a step of initialization in roll, which makes it possible to coordinate the adjustment range of the potentiometer and the range of values of compensation in roll of the compensator equipment item, then a step of adjustment of the value of the compensation in roll. The validation of this latter value with the aid of the declutter button leads to temporary recording of the value of the compensation in roll applied at the end of fine tuning, which value makes it possible to compensate for a discrepancy of alignment in roll (or in other words a rotation) of the video transducer.

The operator then performs the previously defined final validation action, which ends the adjustment operation and initiates recording, in on-board memory means, of the transversal compensation value and the vertical compensation value and/or, as the case may be, of the value of compensation in roll, temporarily recorded during the adjustment operation and which correspond to the currently applied compensation values.

Preferably, the validation of each step of the adjustment operation is achieved by pressing the declutter button briefly, for less than 1 second, for example, while the final validation action consists in pressing the said declutter button for a longer time, for example longer than 3 seconds or even longer than 5 seconds. At the end of the phases of adjustment of the adjustment operation, if the operator observes that an alignment discrepancy persists, he can return to the start of the adjustment operation by pressing the declutter button briefly. Furthermore, validation of the operation of positioning the target is also achieved advantageously by briefly pressing the declutter button.

The on-board memory means comprise, for example a non-volatile memory of the HUD device and/or a non-volatile memory of a memory module of the aircraft independent of the HUD device.

The invention extends to a video transducer, to an HUD device and to a redirectable equipment item (which may be the aforesaid HUD device) capable of employing the method according to the invention.

In particular, the invention relates to an HUD device comprising control elements accessible in the cockpit and capable of emitting control signals that are used, in a nominal mode of operation, for modifying parameters of use of the said HUD device. According to the invention, the HUD device comprises means for operating in the nominal mode or in a maintenance mode, in which the control signals of at least one of its control elements, known as a redirected control element, are used to define the applied harmonization compensation. The HUD device also preferably comprises means for authorizing activation of the maintenance mode only when the aircraft engines are off, and means for projecting onto the screen a reference symbol representing the center of its field in the context of an operation of positioning of a target. The video transducer in turn advantageously comprises means for extracting at least one image to be transmitted to the HUD device from a captured image of larger dimension than the image to be transmitted, the ratio between these two images defining a range of transversal compensation values and a range of vertical compensation values.

Preferably, the HUD device according to the invention comprises a button for actuating a potentiometer for adjusting the luminance and a declutter button, which are used as redirected control elements. Furthermore, the HUD device advantageously comprises:

means for projecting onto the screen, in the context of an adjustment operation, and more precisely in the context of a transversal (or respectively vertical) initialization step of this adjustment operation, a bar representing both the range of adjustment of the potentiometer and the range of transversal (or respectively vertical) compensation values of the video transducer, a cursor on this bar representing the instantaneous position of the potentiometer relative to its adjustment range, and a mark on this bar representing the transversal (or respectively vertical) compensation value currently applied by the video transducer relative to its range of transversal (or respectively vertical) compensation values, means for determining, in real time, in the context of this transversal (or respectively vertical) initialization step, the position of the cursor to be displayed relative to the bar from the control signals emitted by the potentiometer, means for transforming, by calculation in real time, in the context of a step of fine tuning the transversal (or respectively vertical) compensation value of the adjustment operation, any angular displacement of the potentiometer into an angular difference of transversal (or respectively vertical) compensation, by using the ratio between the range of transversal (or respectively vertical) compensation values and the range of adjustment of the potentiometer, the video transducer furthermore comprising means for applying a transversal (or respectively vertical) compensation value that has been fine tuned in real time by means of this angular difference, means for validating each step (or in other words passing on to the next step) of the adjustment operation upon reception of a short signal from the declutter button, means for recording, at the end of the adjustment operation, upon reception of a long signal from the declutter button, in a non-volatile memory integrated into the HUD device and/or into a memory of a memory module of the aircraft, the transversal compensation value and the vertical compensation value temporarily recorded during the adjustment operation.

The invention extends to an aircraft comprising at least one—and preferably only one—video transducer according to the invention, at least one—for example one or two—HUD device or devices according to the invention, and at least one redirectable equipment item according to the invention. Preferably, the redirectable equipment item or items is or are represented by the aforesaid HUD device or devices.

Other details and advantages of the present invention will become apparent upon reading the description hereinafter, which refers to the attached schematic drawings and relates to a preferred embodiment, provided by way of non-limitative example. In these drawings.

Figure 1:
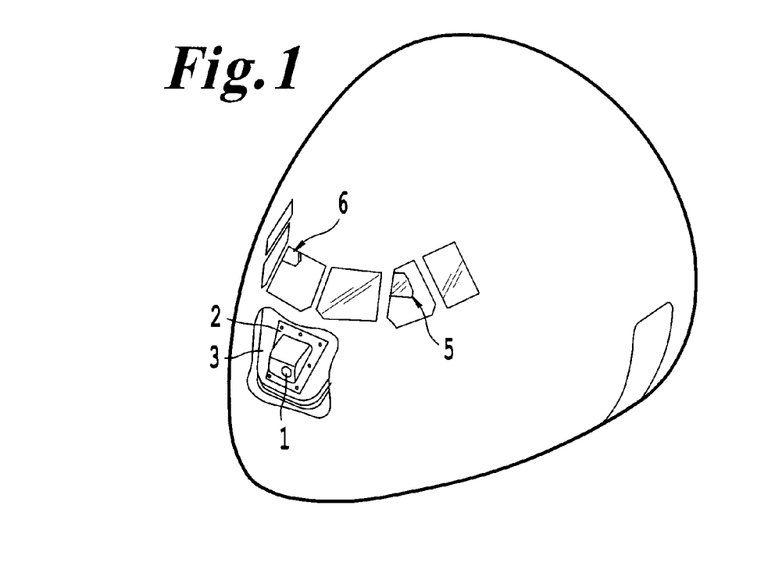
FIG. 1 is a schematic perspective view of the nose cone of an aircraft comprising a video transducer and two head-up display (HUD) devices.
Figure 2:
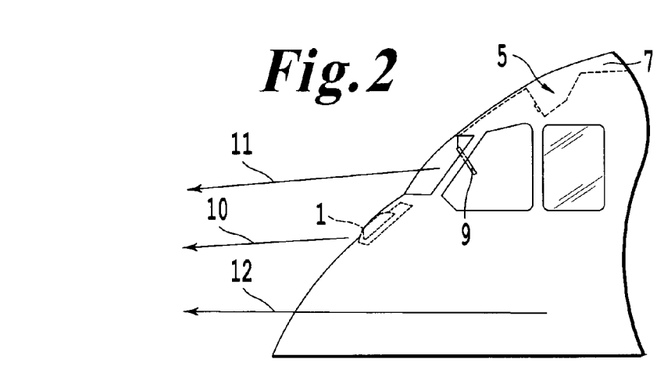
FIG. 2 is a schematic profile view of the nose cone of FIG. 1.

The aircraft, whose nose cone is represented in FIGS. 1 and 2, is equipped with a video transducer 1, such as an infrared video transducer, and with two head-up display devices 5 and 6, known as HUD devices, one of which is provided for the pilot and the other for the copilot.

In the usual manner, video transducer 1 comprises optical means, which make it possible to capture images of the external scene ahead of the aircraft and which define an optical axis 10 of the video transducer, processing means having one or more microprocessors, and a housing for integration and protection of all of these means. Video transducer 1 is borne by a support 2, which is fixed to a platen 3 of the structure of the nose cone of the aircraft.

Figure 4:
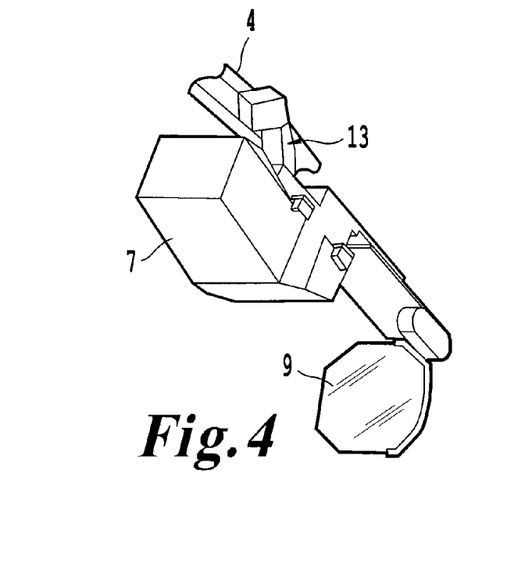
FIG. 4 is a schematic perspective view of part of an HUD device (such an HUD device also comprises a calculator situated in the avionics bay of the aircraft but not shown here)

In the usual manner, each HUD device 5 or 6 comprises a calculator (not visible in the figures, because it is placed in a storage compartment), a projector 7, a screen 9 known as a "combiner" (see FIGS. 2 and 4) and control elements (not shown). It is to be noted that the illustrated screen 9 could be eliminated, since the screen according to the invention—such as defined above—can be formed by a zone of the glass canopy of the cockpit. In the illustrated example, screen 9 is composed of a concave transparent glass plate through which the pilot or copilot can see the external scene ahead of the aircraft and on which there are reflected the images projected by projector 7. Line of sight 11 of HUD device 5 or 6 is defined as being the axis passing through the theoretical eye of the pilot (or copilot) and through the trace, on screen 9 of the HUD device, of the center of the projected symbology. This trace corresponds to the center of the field of the HUD device. Each HUD device 5, 6 is borne by a support 13, which is fixed on one or more longerons 4 of the upper structure of the aircraft cockpit.

The positioning of video transducer 1 relative to its support 2 is assured precisely with the aid of centering pins. On the other hand, because of the complexity of the structure of the aircraft, it is impossible to achieve, by mechanical means, perfect positioning of support 2 of the said transducer relative to a theoretical reference axis 12 of the aircraft. Similarly, the projector and screen of each HUD device 5, 6 can be positioned very precisely relative to support 13, but it is impossible to achieve, by mechanical means, perfect positioning of support 13 relative to theoretical reference axis 12 of the aircraft. As a result, video transducer 1 and HUD devices 5 and 6 do not have perfectly aligned lines of sight.

Harmonization compensation is therefore necessary. In the illustrated example, this is achieved electronically by video transducer 1. For this purpose, the said transducer is advantageously adapted (see FIG. 3) to capture an image 20 of the external scene ahead of the aircraft and, for each HUD device 5, 6, to extract from this image 20 one or more images 21 of smaller dimensions and transmit the latter to the said HUD device. The difference between the width of the captured image and the width of the transmitted image makes it possible to define a range of transversal compensation values (expressed in degrees or in mrad), while the difference between the height of the captured image and the height of the transmitted image makes it possible to define a range of vertical compensation values (expressed in degrees or in mrad). Video transducer 1 has, for example a range of $\pm 1°$ for the transversal compensation values and a range of $\pm 1°$ for the vertical compensation values.

Figure 3:
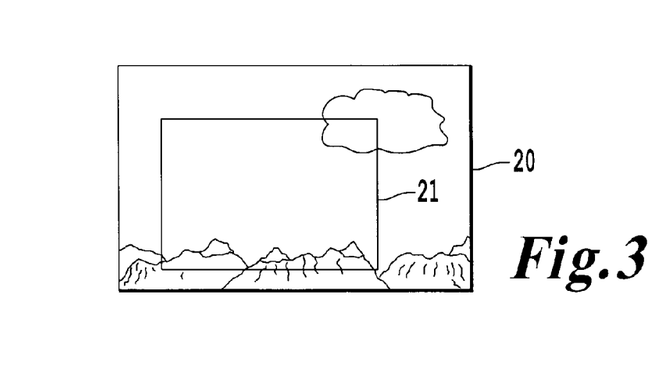
FIG. 3 schematically shows the images respectively captured and transmitted by the video transducer of FIGS. 1 and 2.

During manufacture of the aircraft, tests are performed to determine, for each HUD device 5, 6, a transversal compensation value and a vertical compensation value that video transducer 1 must apply to extract the image to be transmitted to the said HUD device with a view to compensating for the alignment discrepancies resulting from the design and manufacture of the aircraft. These compensation values are stored in a non-volatile memory of a memory module of the aircraft. Once the equipment items are installed, the compensation values determined for HUD device 5 are automatically copied from the memory module of the aircraft to a non-volatile memory of the said HUD device 5; similarly, the compensation values determined for HUD device 6 are automatically copied from the memory module of the aircraft to a non-volatile memory of the said HUD device 6.

During operation, all of these compensation values are transmitted continuously to video transducer 1, which uses them to calculate in real time the image to be extracted for each HUD device 5, 6.

That being the case, it may happen during the life of the aircraft that support 2 of the video transducer and/or platen 3 on which it is fixed become deformed under the effect of shocks and/or stresses. When this is the case, a lack of conformity between the video image projected onto screen 9 of the HUD device, the symbology projected onto this same screen and the external scene viewed through it may be observed for one of HUD devices 5, 6 or for both.

The invention proposes a method for adjusting the harmonization compensation applied by video transducer 1.

In the usual manner, each HUD device 5, 6 comprises control elements, including:

a rotary button for actuating a potentiometer making it possible during nominal operation, to adjust the luminance of the projected images; this button is situated on a control panel of the HUD device (comprising other control elements), generally disposed on a lateral side (that corresponding to the HUD device) of the instrument panel, immediately below the canopy of the aircraft; this button has a full-scale deflection of ±120°, which defines a range known as adjustment range of the potentiometer;

a lateral lever of "joystick" type, at the top of which there is integrated a spring-loaded button known as the declutter button; this lever is disposed on the outside of the seat for the pilot (or copilot, depending on the HUD device in question); by pressing the declutter button successively, it is possible in nominal operation to toggle between a complete presentation of information items generated by the HUD device and a less dense presentation in which certain of these information items have been removed in order to reduce the display congestion of the screen.

According to the invention, each HUD device 5, 6 is adapted such that it can also function in a mode known as maintenance mode, in which the usual use of the control elements described in the foregoing is redirected.

FIGS. 5 to 8 illustrate the progress of the adjustment method according to the invention for one of the HUD devices, for example HUD device 5 of the pilot. The method is similar for adjustment involving HUD device 6 of the copilot.

Figure 5:
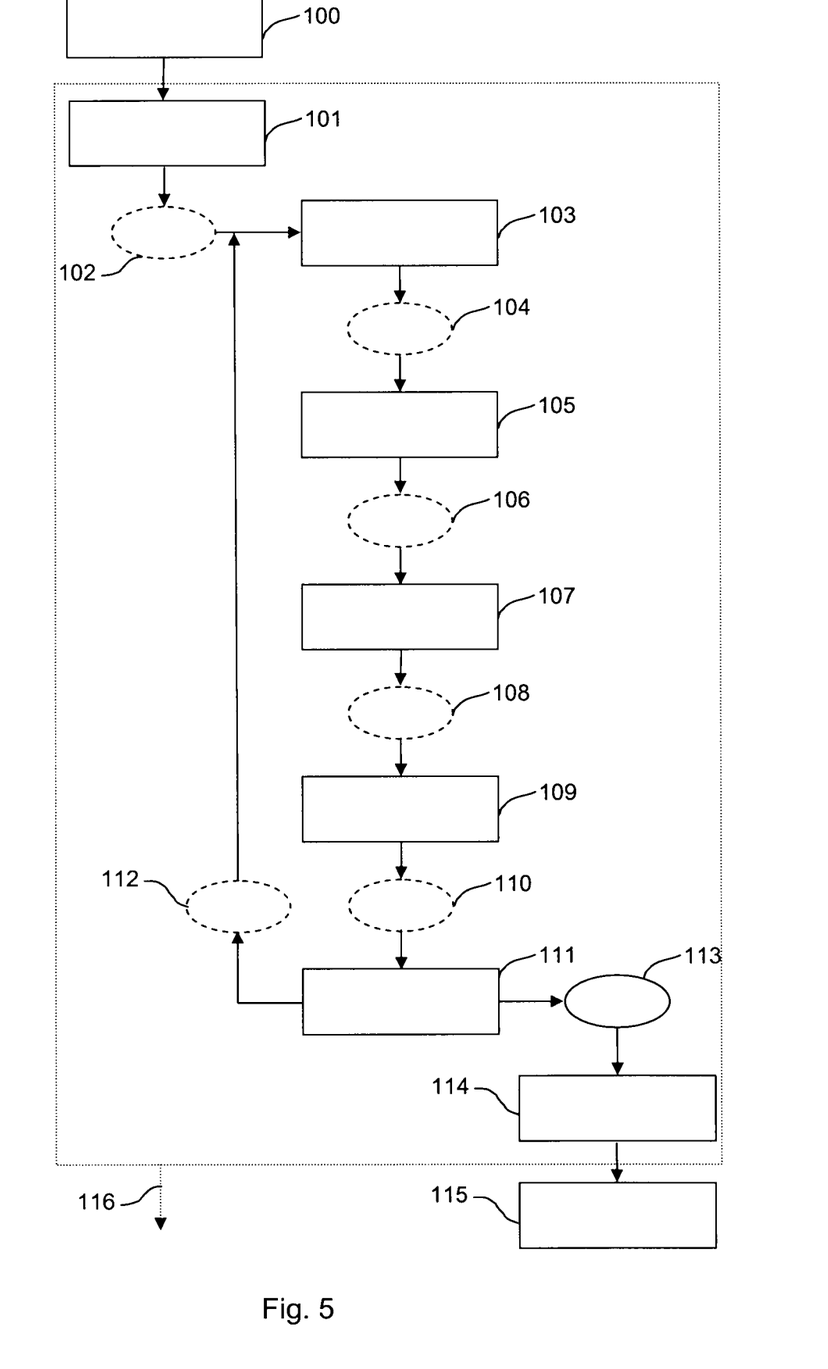
FIG. 5 is a flow chart representing the different steps of the adjustment method according to the invention.
Figure 6:
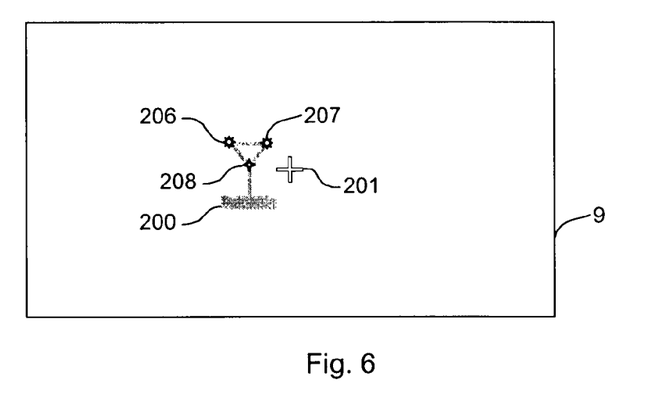
FIG. 6 is a schematic view of the screen onto which the video image and the symbology are projected during a step of positioning a target in the method according to the invention.

In step 100, an operator activates the maintenance mode with the aid of a portable maintenance computer connected to HUD device 5 via a permanent network of the cockpit. Such a connection, making it possible to connect a maintenance computer to the various equipment items and instruments of the aircraft, is provided in the usual and basic manner in all known aircraft. Access to the maintenance mode is therefore achieved with the aid of an existing man-machine interface of the aircraft.

An operation 101 of positioning a target is then performed. The target 200 used preferably comprises three luminous marks, in order to allow for the parallax that exists between the lines of sight of the video transducer and HUD devices 5 and 6: a first mark 206 corresponding to the line of sight of HUD device 5, or in other words intended to be in alignment with the center of the field of the said HUD device 5; a second mark 207 corresponding to the line of sight of HUD device 6 and therefore intended to be in alignment with the center of the field of the said HUD device 6; and a third mark 208 corresponding to the line of sight that the video transducer should have (if its installation were perfect). The three marks define a triangle, the first mark being situated at the top left, the second mark at the top right and the third mark at the bottom center. The first two luminous marks 206, 207 emit in the visible region, while third mark 208 emits in the infrared region. Advantageously, the target is provided with a base comprising: a caster-wheel carriage to facilitate displacement thereof, vertical guide rails for adjustment of the height (in vertical direction) of the triangle formed by the three marks 206-208, an inclinometer and means for adjusting the orientation of the said triangle in roll (rotation of the triangle in its plane) and in pitch (rotation of the triangle around a transversal direction of the target) making it possible to compensate for ground discrepancies and to take the position of the aircraft into account.

The target is installed by a first operator at a distance of approximately one hundred meters ahead of the aircraft. He is guided by a second operator situated in the cockpit, in order to position the target in such a way that its first mark, viewed through screen 9 of HUD device 5, coincides with a reference symbol 201 in the form of a hollow cross (see FIG. 6) projected by the said HUD device 5 at the center of its field. It should be noted that the image projected by HUD device 5 during this operation 101 of positioning the target advantageously comprises, in addition to reference symbol 201, other information items (not shown) such as text data reminding that the maintenance mode is active and that the operation of positioning the target is in progress, and furnishing the instructions to be followed to achieve this operation, to validate it or to exit the maintenance mode.

When the target is correctly positioned, the operator present in the cockpit validates, in 102, the positioning operation 101 by pressing the declutter button of HUD device 5 for a brief instant (shorter than 1 s).

Figure 7:
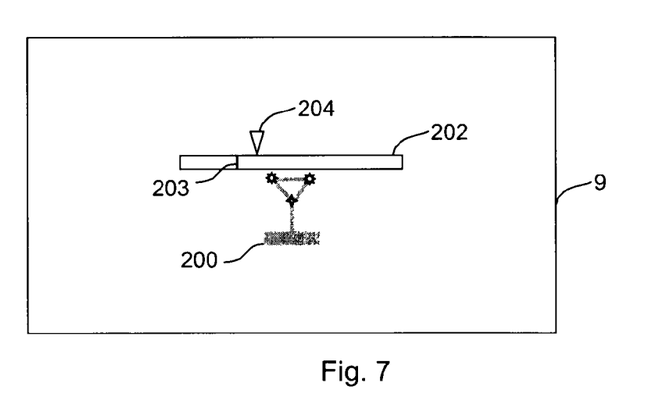
FIG. 7 is a schematic view of the screen during a transversal or vertical initialization step in the method according to the invention.

This validation initiates an adjustment operation, which starts with a step 103 of vertical initialization. As illustrated in FIG. 7, HUD device 5 then projects an image comprising in particular: a bar 202 representing both the range of adjustment of the potentiometer and the range of vertical compensation values of video transducer 1; a cursor 203 representing the instantaneous position of the potentiometer relative to its adjustment range; a triangular reference symbol 204 representing the vertical compensation value currently applied by the video transducer relative to its range of vertical compensation values (if the method according to the invention is being employed for the first time in this aircraft, this compensation value is that which was determined during manufacture of the aircraft). In other words, the bar represents a range of ±120° for cursor 203 and a range of ±1° for reference symbol 204. The projected image also preferably comprises other information items (not shown), such as text data reminding that the maintenance mode is active and that the vertical initialization step is in progress, and furnishing the instructions to be followed to achieve this step, to validate it or to exit the maintenance mode. During this step 103, HUD device 5 determines in real time the position of cursor 203 relative to bar 202 on the basis of control signals emitted by the potentiometer. The operator manipulates the potentiometer button until cursor 203 is aligned with reference symbol 204. This step makes it possible to coordinate the range of adjustment of the potentiometer with the range of vertical compensation values of video transducer 1, to ensure that each of the two opposite stops of the potentiometer button correspond respectively to the two limits of the range of vertical compensation values of the video transducer.

When alignment between cursor 203 and reference symbol 204 is established, the operator validates, in 104, vertical initialization step 103 by pressing the declutter button of HUD device 5 for a brief instant (shorter than 1 s).

This validation initiates a step 105 of fine tuning the vertical compensation value. In this step, HUD device 5 projects (see FIG. 8) the image of the external scene, including image 205 of the target, that video transducer 1 is transmitting to it. The operator, installed at the position of the pilot, manipulates the potentiometer button. The HUD device calculates in real time the angular displacement of the potentiometer, corresponding to the angle formed between the initial position of the potentiometer (obtained from vertical initialization step 103) and its current position, and transforms this displacement into an angular difference of vertical compensation by using the ratio between the range of vertical compensation values and the adjustment range of the potentiometer. In the illustrated example, this ratio is 1/120. The angular difference calculated in this way is displayed on screen 9 (see FIG. 8) and added to the initial vertical compensation value that the video transducer applied before the method according to the invention was begun. The new value of vertical compensation calculated in this way is transmitted in real time by HUD device 5 to video transducer 1, which instantaneously applies it to define the image to be extracted and to be transmitted to the said HUD device 5. In this way, any displacement of the potentiometer button leads in real time to a vertical translation of the video image projected by HUD device 5. The operator, who observes the projected video image and the external scene, manipulates the potentiometer button until video image 205 of the target is matched in vertical direction with real target 200 viewed through screen 9. More precisely, to allow for the parallax, he attempts to bring third mark 209 of image 205 of the target projected onto the screen into vertical alignment with first mark 206 of real target 200 viewed through the screen. It should be noted that when the method according to the invention is employed for HUD device 6 (of the copilot), the operator attempts to bring third mark 209 of the image of the target projected onto the screen into vertical alignment with second mark 207 of the real target viewed through the screen.

Figure 8:
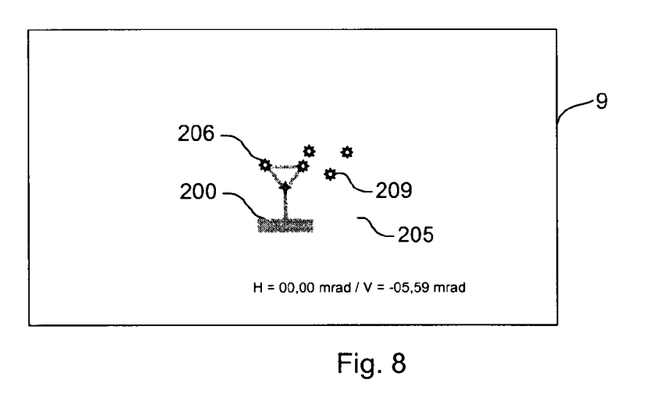
FIG. 8 is a schematic view of the screen during a step of fine tuning the vertical compensation value in the method according to the invention.

When matching is observed, the operator validates, in 106, this step 105 of fine tuning the vertical compensation value by pressing the declutter button of HUD device 5 for a brief instant (shorter than 1 s). The vertical compensation value applied at this instant by video transducer 1 is temporarily recorded in a memory of HUD device 5.

Validation 106 initiates a transversal initialization step 107. HUD device 5 then projects an image comprising in particular bar 202 illustrated in FIG. 7, a cursor 203 representing the instantaneous position of the potentiometer relative to its adjustment range, and a triangular reference symbol representing the transversal compensation value currently applied by the video transducer relative to its range of transversal compensation values (it may be the one determined during manufacture of the aircraft). The operator manipulates the potentiometer button until cursor 203 is aligned with the said reference symbol. This transversal initialization step 107 makes it possible to coordinate the range of adjustment of the potentiometer with the range of transversal compensation values of video transducer 1, so that each of the two opposite stops of the potentiometer button correspond respectively to the two limits of the range of transversal compensation values of the video transducer.

The operator then validates, in 108, transversal initialization step 107 by pressing the declutter button of HUD device 5 for a brief instant (shorter than 1 s).

This validation initiates a step 109 of fine tuning the transversal compensation value. In this step, in a manner analogous to step 105 of fine tuning the vertical compensation value, any displacement of the potentiometer button leads in real time to a transversal (or in other words horizontal) translation of the video image projected by the HUD device. The operator, who observes the projected video image and the external scene, manipulates the potentiometer button until video image 205 of the target (and especially of its third mark 209) is matched in transversal direction with real target 200 (and more precisely with its first mark 206 for HUD device 5 and with its second mark 207 for HUD device 6) viewed through screen 9. In addition to the image received from video transducer 1, HUD device 5 projects certain information items useful to the progress of this step 109, including the angular difference of transversal compensation, which it calculates in real time, lines of text reminding that the maintenance mode is active and that the step of fine tuning the transversal compensation value is in progress, and lines of text furnishing the instructions to be followed to achieve this step, to validate it or to exit the maintenance mode.

When matching is observed, the operator validates, in 110, this step 109 of fine tuning the transversal compensation value by pressing the declutter button of HUD device 5 for a brief instant (shorter than 1 s). The transversal compensation value applied at this instant by video transducer 1 is temporarily recorded in a memory of HUD device 5.

In step 111, the operator checks that the adjustment operation has led to satisfactory superposition of the video image on the external scene. If such is not the case, the operator has the possibility, by pressing the declutter button of HUD device 5 for a brief instant (shorter than 1 s) in 112, to return to the start of the adjustment operation, or in other words to vertical initialization step 103, and to reiterate steps 103 to 109 in order to refine the vertical and transversal values of fine tuning.

On the other hand, if the operator estimates that the adjustment operation has progressed correctly, he executes a final validation action 113 by pressing the declutter button of HUD device 5 for a long instant, for example on the order of 5 seconds. This final validation initiates recording 114, in a memory module of the aircraft, of the vertical and transversal compensation values currently applied (or in other words obtained from fine tuning steps 105 and 109). These values are recorded in a memory zone separate from that in which the compensation values determined during the phase of manufacture of the aircraft are stored, so that it is always possible to return to the initial adjustment. It should be noted that, as a variant or in combination, they may possibly be recorded in a memory module of HUD device 5. Final validation action 113 also leads to exiting the maintenance mode in 115 (which can be done simultaneously with, before or after recording 114).

At any moment during the method according to the invention, it is possible to interrupt this method and to exit the maintenance mode in 116, by releasing the interlock of screen 9 of HUD device 5 and/or by folding it back into a storage position, or else by turning off projector 7 of the said device or finally by suppressing the display of the video image. This exiting of the maintenance mode takes place without recording of compensation values.

The invention may be the object of numerous variants as compared with the illustrated embodiment, so long as these variants fall within the context defined by the claims.

For example, the vertical—or respectively transversal—initialization step may be achieved by transmitting the value "zero" to the video transducer by way of a vertical—or respectively transversal—compensation value to be applied instantaneously, and by requiring the operator to position the potentiometer at the center of its adjustment range.

The invention claimed is:

1. A method for adjustment of a compensation, known as harmonization compensation, applied to alleviate a discrepancy of conformity between a video image transmitted by a video transducer and projected onto a screen by a head-up display device, known as a HUD device, of an aircraft, and an external scene ahead of the aircraft visible through the screen and/or a symbology generated and projected onto the screen by the HUD device, the aircraft comprising equipment items provided with control elements accessible in a cockpit, each control element being capable of emitting control signals that are used, in a mode of operation known as nominal mode, to modify control parameters of a corresponding equipment item, the method comprising:

pre-programming at least one equipment item of the aircraft, known as a redirectable equipment item, in such a way that the at least one equipment item can function alternatively according to the nominal mode and according to another mode, known as maintenance mode, in which the control signals of at least one control element, known as a redirected control element, are used to define applied harmonization compensation, the pre-programming only authorizing activation of the maintenance mode when the engines of the aircraft are off;

activating the maintenance mode and starting an adjustment operation;

receiving adjustment commands from at least one redirected control element manipulated by a user observing from a pilot's position, the video image transmitted by the video transducer and projected onto the screen, and the external scene through the screen and/or the symbology projected onto the screen during the adjustment operation until the video image is matched with the external scene and/or with the symbology;

modifying in real time the applied harmonization compensation based on the adjustment commands; and performing a final validation action that ends the adjustment operation and recording in a memory installed on board the aircraft, one or more values representative of the harmonization compensation applied at an end of the adjustment operation.

2. The method according to claim 1, further comprising:

positioning of a target after activation of the maintenance mode and prior to the adjustment operation, during which a target is positioned in the external scene in alignment of a center of a field of the HUD device, the HUD device projecting onto the screen a reference symbol representing the center.

3. The method according to claim 1, wherein the redirectable equipment item is the HUD device.

4. The method according to claim 1, wherein the redirected control elements are chosen from among: a button for actuating a potentiometer for adjusting a luminance of the HUD device, and a declutter button of the HUD device.

5. The method according to claim 4, wherein the potentiometer for adjusting the luminance is used, during the adjustment operation, to define successively an angular value of compensation in a transversal direction, known as transversal compensation value, and an angular value of compensation in a vertical direction, known as vertical compensation value, and in that the declutter button is used to validate each step of the adjustment operation and to perform the final validation action.

6. The method according to claim 1, wherein the harmonization compensation is achieved by the video transducer, which is adapted to extract at least one image to be transmitted to the HUD device from a captured image of greater dimension than the image to be transmitted, a ratio between these two images defining a range of transversal compensation values and a range of vertical compensation values.

7. The method according to claim 1, wherein the adjustment operation comprises a phase of adjustment in the transversal direction and a phase of adjustment in the vertical direction.

8. The method according to claim 5, wherein the phase of adjustment in transversal—or respectively vertical—direction comprises an initialization step, which coordinates the range of adjustment of the potentiometer and the range of transversal—or respectively vertical—compensation values of the video transducer, and wherein: the HUD device is used to display a bar representing both a range of adjustment of the potentiometer and a range of transversal—or respectively vertical—compensation values, a cursor on the bar, representing an instantaneous position of the potentiometer relative to its adjustment range, the HUD device determining in real time a position of the cursor to be displayed relative to the bar on a basis of control signals emitted by the potentiometer, a reference symbol on the bar, representing the transversal—or respectively vertical—compensation value currently applied relative to the range of transversal—or respectively vertical—compensation values, the operator manipulates the potentiometer button in such a way as to align the cursor with the reference symbol.

9. The method according to claim 5, wherein the phase of adjustment in the transversal—or respectively vertical—direction comprises a step of fine tuning the transversal—or respectively vertical—compensation value, wherein: the HUD device transforms by a real-time calculation any angular displacement of the potentiometer into an angular difference of transversal—or respectively vertical—compensation, by using a ratio between a range of transversal—or respectively vertical—compensation values and a range of adjustment of the potentiometer, the video transducer applies, in real time, a transversal—or respectively vertical—compensation value fine tuned in real time with of an angular difference calculated in this way, the operator checks the external scene and the video image transmitted by the video transducer and projected by the HUD device, and manipulates the potentiometer button until matching of the video image with the external scene is achieved in the transversal—or respectively vertical—direction.

10. An aircraft, including a video transducer, at least one head-up display device and at least one redirectable equipment item configured to perform the method according to claim 1.

* * * * *